US012645433B2

(12) United States Patent
An et al.

(10) Patent No.: US 12,645,433 B2
(45) Date of Patent: Jun. 2, 2026

(54) ELECTRONIC DEVICE AND METHOD FOR DISPLAYING HOME SCREEN USING SAME

(71) Applicant: Samsung Electronics Co., Ltd., Suwon-si (KR)

(72) Inventors: Sunghyun An, Suwon-si (KR); Sunghoon Bae, Suwon-si (KR); Dongjun Lee, Suwon-si (KR); Youngjin Jo, Suwon-si (KR); Hangrak Choi, Suwon-si (KR); Jaeyoung Hwang, Suwon-si (KR); Heangsu Kim, Suwon-si (KR); Dwoosung Lee, Suwon-si (KR); Yonggil Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 18/582,007

(22) Filed: Feb. 20, 2024

(65) Prior Publication Data

US 2024/0256231 A1      Aug. 1, 2024

Related U.S. Application Data

(63) Continuation of application No. PCT/KR2024/001120, filed on Jan. 24, 2024.

(30) Foreign Application Priority Data

Jan. 31, 2023    (KR) ........................ 10-2023-0013091

(51) Int. Cl.
*G06F 3/048* (2013.01)
*G06F 3/0482* (2013.01)
(Continued)

(52) U.S. Cl.
CPC .............. *G06F 8/34* (2013.01); *G06F 3/0482* (2013.01); *G06F 9/451* (2018.02)

(58) Field of Classification Search
None
See application file for complete search history.

(56) References Cited

U.S. PATENT DOCUMENTS

2004/0267822 A1    12/2004   Curran et al.
2012/0311280 A1    12/2012   Schmidt et al.
(Continued)

FOREIGN PATENT DOCUMENTS

JP          2013-258512  A      12/2013
KR     10-2005-0001301  A       1/2005
(Continued)

OTHER PUBLICATIONS

US 10,788,968 B2, 09/2020, Lee et al. (withdrawn)
International Search Report dated Apr. 25, 2024, issued in International Application No. PCT/KR2024/001120.

*Primary Examiner* — Thanh T Vu
(74) *Attorney, Agent, or Firm* — Jefferson IP Law, LLP

(57) ABSTRACT

A first electronic device is provided. The first electronic device includes a display, a communication circuit, memory, and a processor. The processor is configured to execute an initial setup function for initial setup of the first electronic device, recognize a second electronic device in response to the execution of the initial setup function, request first data from the recognized second electronic device, obtain the first data produced by the second electronic device from the second electronic device, in response to completion of the initial setup function, display a first home screen implemented based on the obtained first data on the display and request second data corresponding to an application stored in the second electronic device from the second electronic device, obtain the second data from the second electronic
(Continued)

device, and display a second home screen implemented based on the obtained second data on the display.

20 Claims, 10 Drawing Sheets

(51) Int. Cl.
  *G06F 8/34*      (2018.01)
  *G06F 9/451*     (2018.01)

(56)                    References Cited

U.S. PATENT DOCUMENTS

| | | | | |
|---|---|---|---|---|
| 2013/0086577 | A1* | 4/2013 | Nakashima | H04N 21/443 |
| | | | | 717/178 |
| 2016/0027045 | A1* | 1/2016 | Kurian | G06F 16/24575 |
| | | | | 705/14.49 |
| 2016/0124626 | A1* | 5/2016 | Lee | H04M 1/72403 |
| | | | | 715/747 |
| 2016/0357545 | A1* | 12/2016 | Linn | G06F 8/62 |
| 2019/0075453 | A1 | 3/2019 | Yoon et al. | |
| 2020/0110529 | A1* | 4/2020 | Gao | G06F 3/0486 |
| 2020/0167121 | A1* | 5/2020 | Shim | G06F 3/04817 |
| 2021/0325948 | A1 | 10/2021 | Lee et al. | |
| 2023/0161673 | A1 | 5/2023 | Choi et al. | |
| 2023/0214087 | A1 | 7/2023 | Yu | |

FOREIGN PATENT DOCUMENTS

| | | |
|---|---|---|
| KR | 10-2014-0031366 A | 3/2014 |
| KR | 10-2014-0094082 A | 7/2014 |
| KR | 10-2016-0050336 A | 5/2016 |
| KR | 10-2022-0015815 A | 2/2022 |
| KR | 10-2022-0017075 A | 2/2022 |
| KR | 10-2022-0017124 A | 2/2022 |

* cited by examiner

FIG. 5

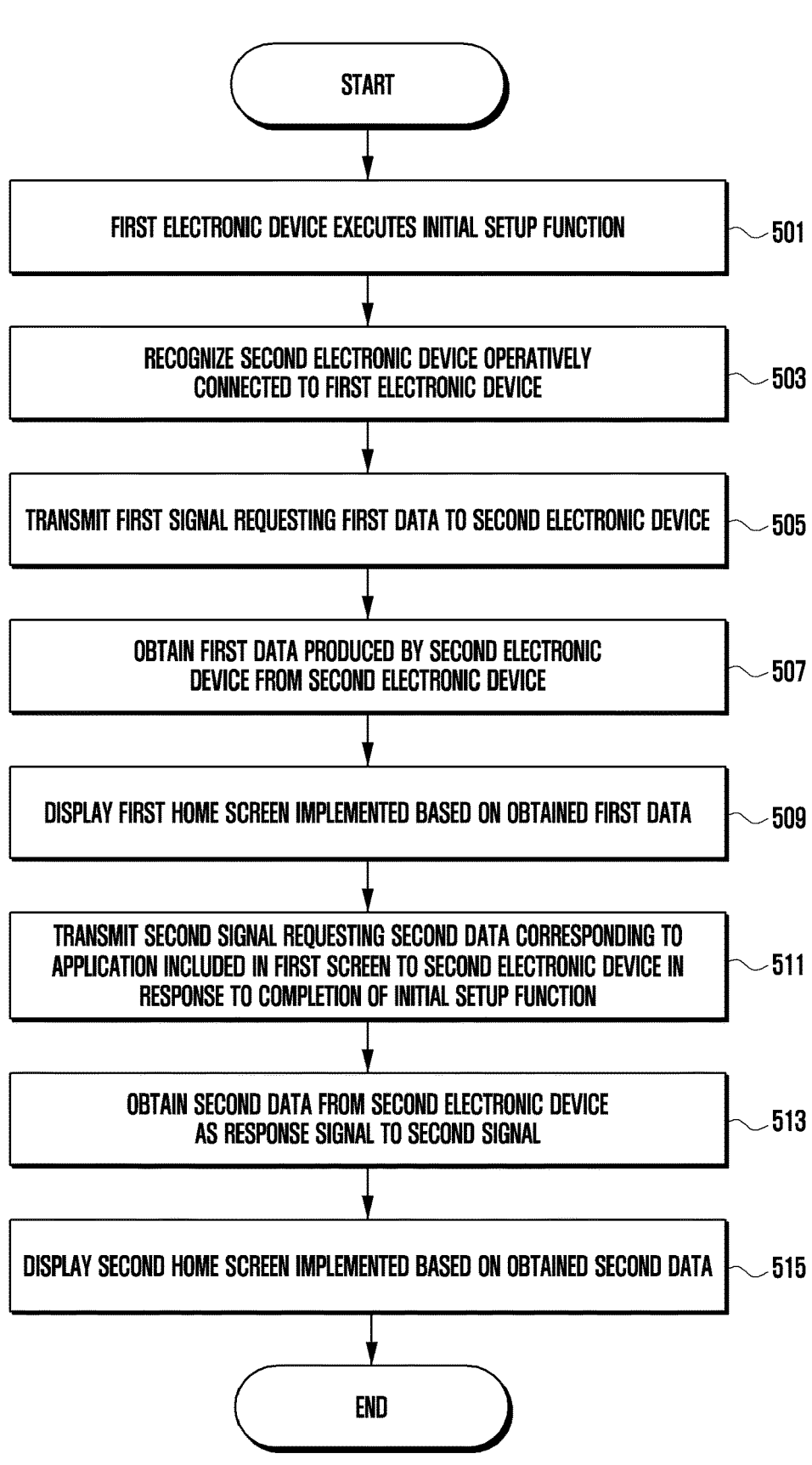

START

FIRST ELECTRONIC DEVICE EXECUTES INITIAL SETUP FUNCTION — 501

RECOGNIZE SECOND ELECTRONIC DEVICE OPERATIVELY CONNECTED TO FIRST ELECTRONIC DEVICE — 503

TRANSMIT FIRST SIGNAL REQUESTING FIRST DATA TO SECOND ELECTRONIC DEVICE — 505

OBTAIN FIRST DATA PRODUCED BY SECOND ELECTRONIC DEVICE FROM SECOND ELECTRONIC DEVICE — 507

DISPLAY FIRST HOME SCREEN IMPLEMENTED BASED ON OBTAINED FIRST DATA — 509

TRANSMIT SECOND SIGNAL REQUESTING SECOND DATA CORRESPONDING TO APPLICATION INCLUDED IN FIRST SCREEN TO SECOND ELECTRONIC DEVICE IN RESPONSE TO COMPLETION OF INITIAL SETUP FUNCTION — 511

OBTAIN SECOND DATA FROM SECOND ELECTRONIC DEVICE AS RESPONSE SIGNAL TO SECOND SIGNAL — 513

DISPLAY SECOND HOME SCREEN IMPLEMENTED BASED ON OBTAINED SECOND DATA — 515

END

ELECTRONIC DEVICE AND METHOD FOR DISPLAYING HOME SCREEN USING SAME

CROSS-REFERENCE TO RELATED APPLICATION(S)

This application is a continuation application, claiming priority under § 365(c), of an International application No. PCT/KR2024/001120, filed on Jan. 24, 2024, which is based on and claims the benefit of a Korean patent application number 10-2023-0013091, filed on Jan. 31, 2023, in the Korean Intellectual Property Office, the disclosure of which is incorporated by reference herein in its entirety.

TECHNICAL FIELD

The disclosure relates to an electronic device and a method for displaying a home screen using the same.

BACKGROUND ART

When a user purchases a new electronic device (e.g., an electronic device in the initialized state), the user may wish to apply substantially the same usage environment of an existing electronic device (e.g., an old electronic device) to the new electronic device. For example, a user may wish to use data and programs (e.g., applications), which are stored in the old electronic device, in the new electronic device, based on the same environment. The electronic device may restore the data stored in the old electronic device using a backup function based on a backup-related application (e.g., a smart switch program, a smart switch function, and/or a backup application) and store the restored data in the new electronic device. For example, the new electronic device may be connected to the old electronic device through wired or wireless communication (e.g., operatively) and may obtain the data stored in the old electronic device. The backup-related applications may support transfer of data (e.g., a backup function) between the same operating systems or between different operating systems.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

As electronic devices support various functions and as performance of the functions is improved, the capacity of data and programs stored in the electronic devices is gradually increasing. For example, if a user purchases a new electronic device and executes a backup-related application (e.g., a backup-related function), data is transferred from an existing electronic device (e.g., an old electronic device) to the new electronic device. As the capacity of backup data increases, the time required for data transfer may also increase.

Aspects of the disclosure are to address at least the above-mentioned problems and/or disadvantages and to provide at least the advantages described below. Accordingly, an aspect of the disclosure is to provide an electronic device (e.g., a new electronic device) that displays a pre-configured default screen (e.g., a default home screen) through a display even when a backup function is being performed in the background (e.g., a backup function is not completed) so that a user may use the electronic device. For example, an electronic device may continue to perform the backup function in the background while performing a function based on user input. In response to the completion of the backup function, the electronic device may change the default screen being displayed to a home screen (e.g., the home screen in the previous electronic device) based on the backup function and display the same.

If the home screen is changed after the backup function is completed, the electronic device may cause an error (e.g., conflict between programs) in relation to the programs and setting information, which are installed and changed by the user while the backup function is being performed, or a problem in which data is changed. It may degrade usability of the user who wishes to continuously use the electronic device.

Another aspect of the disclosure is to provide an electronic device that implements a first home screen based on a home screen, based on the state in which the backup function is completed, and primarily display the first home screen in the initial setup step for performing a backup function. According to an embodiment, the user may identify the first home screen being displayed on the display and recognize that the backup function is being performed. According to an embodiment, the objective is to improve user reliability according to execution of the backup function and improve the usability of the electronic device (e.g., a new electronic device) in which the backup function is executed.

Additional aspects will be set forth in part in the description which follows and, in part, will be apparent from the description, or may be learned by practice of the presented embodiments.

Solution to Problem

In accordance with an aspect of the disclosure, a first electronic device is provided. The first electronic device includes a display, a communication circuit, memory, and a processor operatively connected to the display, the communication circuit, and the memory. The processor is configured to execute an initial setup function for initial setup of the first electronic device, recognize a second electronic device that is operatively connected through the communication circuit in response to the execution of the initial setup function, request first data from the recognized second electronic device, obtain the first data produced by the second electronic device from the second electronic device, in response to completion of the initial setup function, display a first home screen implemented based on the obtained first data on the display and request second data corresponding to an application stored in the second electronic device from the second electronic device, obtain the second data from the second electronic device, and display a second home screen implemented based on the obtained second data on the display.

In accordance with another aspect of the disclosure, a method of operating a first electronic device is provided. The method includes executing an initial setup function for initial setup of the first electronic device, recognizing a second electronic device that is operatively connected in response to the execution of the initial setup function, requesting first data from the recognized second electronic device, obtaining the first data produced by the second electronic device from the second electronic device, in response to completion of the initial setup function, displaying a first home screen implemented based on the obtained first data on a display and requesting second data corresponding to an application stored in the second electronic device from the second electronic device, obtaining the second data from the second electronic device, and displaying a second home screen implemented based on the obtained second data on the display.

In accordance with another aspect of the disclosure, a non-transitory computer-readable storage medium (or computer program product) storing one or more programs is provided. The one or more programs includes instructions that perform, when executed by a processor of an electronic device, executing an initial setup function for initial setup of the first electronic device, recognizing a second electronic device that is operatively connected in response to the execution of the initial setup function, requesting first data from the recognized second electronic device, obtaining the first data produced by the second electronic device from the second electronic device, in response to completion of the initial setup function, displaying a first home screen implemented based on the obtained first data on a display and requesting second data corresponding to an application stored in the second electronic device from the second electronic device, obtaining the second data from the second electronic device, and displaying a second home screen implemented based on the obtained second data on the display.

Advantageous Effects of Invention

According to an embodiment, a first electronic device (e.g., a new electronic device) may obtain first data (e.g., initial setup data) from another electronic device (e.g., a second electronic device) in response to the initial setup function for execution of the backup function and implement a first screen, based on the obtained first data. For example, the first screen may include a home screen being displayed on a display of another electronic device. For example, the first screen may be implemented based on a home screen (e.g., a second home screen) to be displayed after the backup function is completed, and may include an example of the second home screen.

According to an embodiment, the first screen may be preferentially displayed on the display before performing and completing the backup function in the first electronic device, so that the user's reliability in performing the backup function may be improved and the usability of the first electronic device may be improved. Since the user may at least partially utilize the first electronic device even while the backup function is being performed, the continuity according to the use of the first electronic device may be improved. According to an embodiment, data utilized in the first electronic device may not be lost while the backup function is performed, and the user convenience may be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5 is a flowchart illustrating a method of restoring a home screen in a first electronic device according to an embodiment of the disclosure;

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
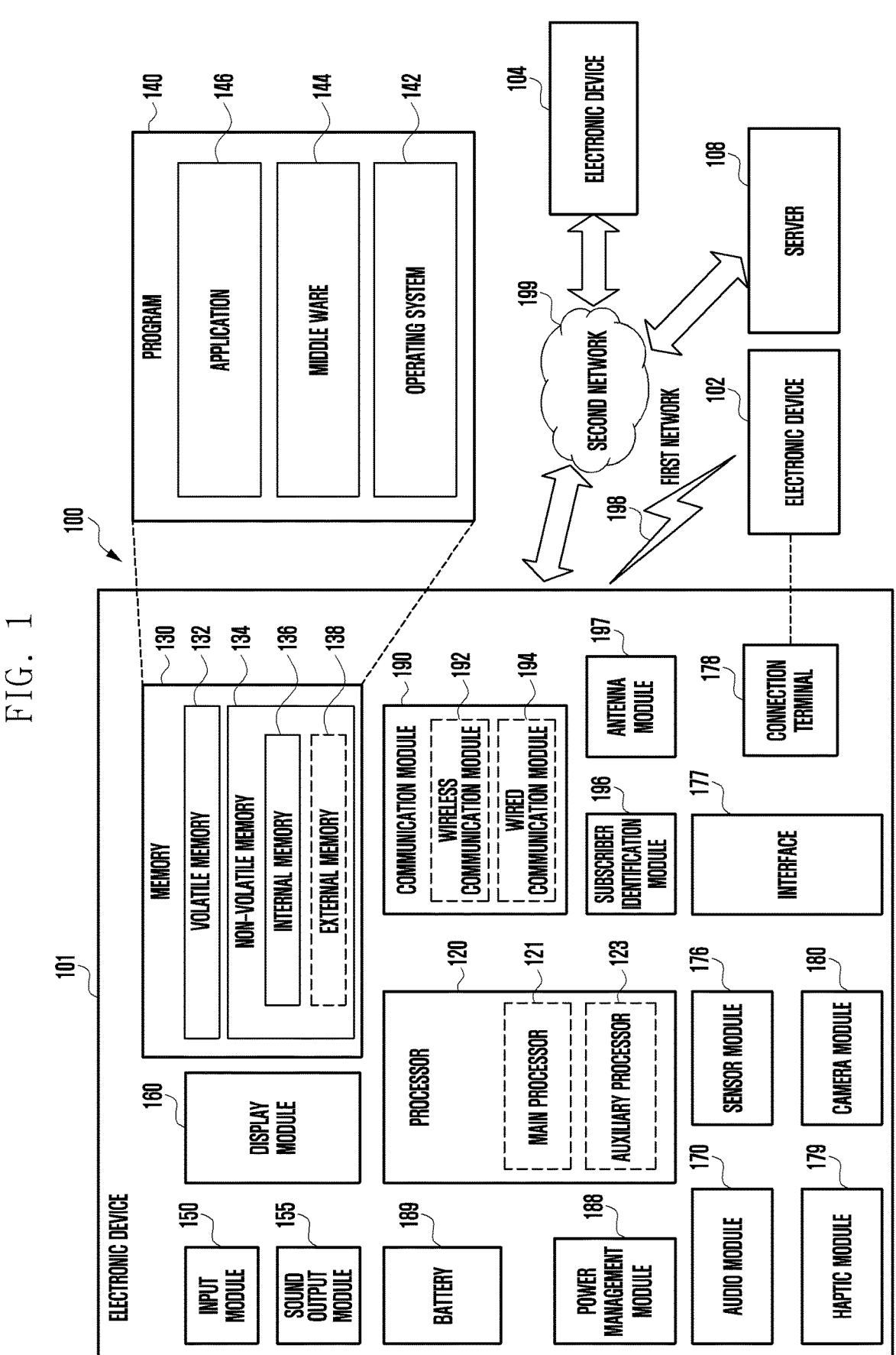
FIG. 1 is a block diagram of an electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server

108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a nRFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
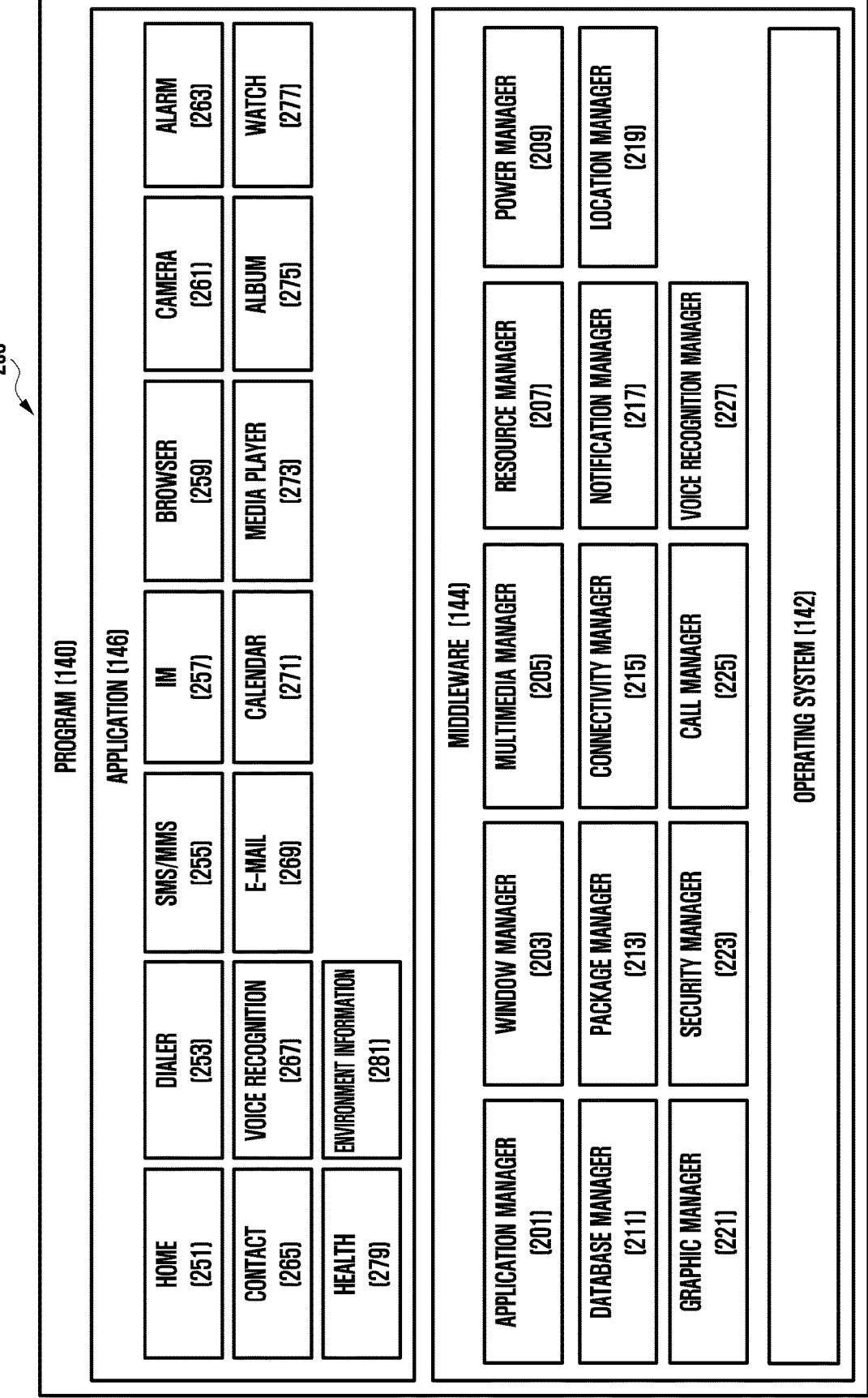
FIG. 2 is a block diagram illustrating a program according to an embodiment of the disclosure.

FIG. 2 is a block diagram 200 illustrating the program 140 according to an embodiment of the disclosure.

A program 140 in FIG. 2 may be at least partially similar to the program 140 in FIG. 1 or may further include other embodiments of the program 140. The program 140 in FIG. 2 or may further include a program stored in a memory 130 of the electronic device 101.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application.

According to an embodiment, the application 146 may further include an information exchanging application (not shown) that is capable of supporting information exchange between the electronic device 101 and the external electronic device 102, 104, 108. The information exchange application, for example, may include a notification relay application adapted to transfer designated information (e.g., a call, message, or alert) to the external electronic device or a device management application adapted to manage the external electronic device.

The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

According to an embodiment of the disclosure, the program 140 may include a program that configures a home screen of an electronic device 101. For example, a package manager 213 included in the middleware 144 may manage package files (e.g., home screen package files) produced based on data and attribute information related to the configuration of the home screen. The electronic device 101 may produce a home screen, based on a package file related to the configuration of the home screen, and display the generated home screen through a display (e.g., the display module 160 in FIG. 1). When the initialized electronic device 101 performs an initial setup function (e.g., a setup function for the operation of the electronic device 101 when booting the electronic device 101), the electronic device 101 may implement a home screen based on the package file.

The program 140 may include a backup-related program for transfer data stored in an external electronic device (e.g., the electronic device 102 or 104 in FIG. 1) to the electronic device 101. For example, the program 140 may include at least one of a program related to a backup function for transferring backup data, a program performing a "smart switch function", and/or a "smart switch program". The electronic device 101 may execute a backup-related program while displaying a home screen produced based on the package file and execute a backup function based on the backup-related program.

Figure 3:
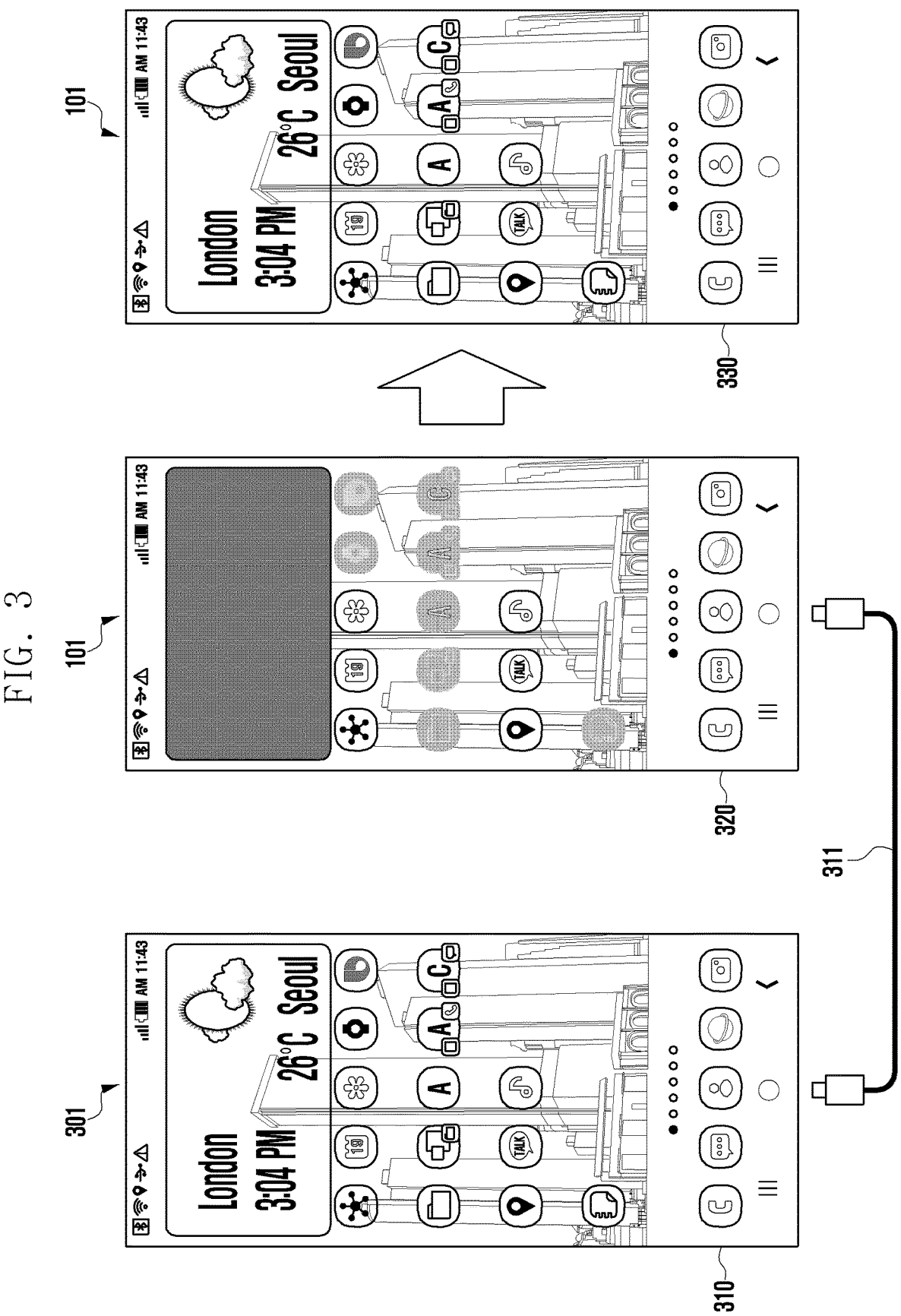
FIG. 3 is a diagram illustrating a home screen of a first electronic device according to execution of a backup function according to an embodiment of the disclosure.

FIG. 3 is a diagram illustrating a home screen of a first electronic device according to the execution of a backup function according to an embodiment of the disclosure.

Referring to FIG. 3, a first electronic device 101 (e.g., a new electronic device) in FIG. 3 may be at least partially similar to the electronic device 101 in FIG. 1 or may further include other embodiments of the electronic device 101. A second electronic device 301 (e.g., an old electronic device) in FIG. 3 may be at least partially similar to the electronic device 102 or 104 (e.g., an external electronic device) in FIG. 1 or may further include other embodiments of the electronic device 102 or 104.

Referring to FIG. 3, the first electronic device 101 may include a new electronic device newly purchased by the user (e.g., an electronic device that obtains backup data based on the execution of a backup function or an electronic device in an initialized state), and the second electronic device 301 may include an old electronic device that the user has previously used (e.g., an electronic device that provides backup data based on the execution of a backup function).

Referring to FIG. 3, a backup function may be executed between the first electronic device 101 and the second electronic device 301, and in response to the execution of the backup function, data (e.g., backup data) stored in the second electronic device 301 may be at least partially provided to the first electronic device 101. The first electronic device 101 may implement a home screen (e.g., a first home screen 320 or a second home screen 330), based on the data obtained from the second electronic device 301, and display the home screen through a display (e.g., the display module 160 in FIG. 1).

The first electronic device 101 may include an initialized electronic device and may execute an initial setup function when booting. For example, the initial setup function may include a function that is executed first when the first electronic device 101 operates. The initial setup function may include a "setup wizard function". The initial setup function may be preset during the process of manufacturing the first electronic device 101. The initial setup function may be included as part of the backup function. The initial setup function may be executed before backup data is transferred based on the backup function.

Referring to FIG. 3, the first electronic device 101 may be operatively connected to the second electronic device 301 using a wired connection member (e.g., a wired cable 311) in order to execute a backup function. According to an embodiment of the disclosure, the connection is not limited to the wired connection, and the first electronic device 101 and the second electronic device 301 may be connected to each other through various communication methods to transfer backup data.

When executing a backup function, the first electronic device 101 may execute an initial setup function, recognize a second electronic device 301 connected to the first electronic device 101, and obtain first data from the recognized second electronic device 301. For example, the first data may include at least one piece of information for configuring the first home screen 320, information related to the layout of the home screen, information related to wallpaper (e.g., a background screen), information related to a lock screen, information related to an application to be installed, information related to an icon of an application to be installed, and/or list information. For example, the first data may include the minimum information needed to implement the home screen.

The second electronic device 301 may identify the execution of the backup function by the first electronic device 101 and, in response to the identification, produce first data, based on the home screen 310 being displayed. The first electronic device 101 may transmit, to the second electronic device 301, a first request signal for requesting first data, and the second electronic device 301 may provide first data to the first electronic device 101 in response to the reception of the first request signal. The first electronic device 101 may implement a first home screen 320, based on the first data, and display the first home screen 320 on the display 160. In response to completion of the initial setup function, the first electronic device 101 may execute a backup function (e.g., an operation of transferring backup data) while displaying the first home screen 320 on the display 160.

The first electronic device 101 may transmit, to the second electronic device 301, a second request signal in order to obtain backup data (e.g., second data or data related to programs stored or installed in the second electronic device 301) from the second electronic device 301. For example, the second electronic device 301 may provide second data to the first electronic device 101 in response to reception of the second request signal. The first electronic device 101 may implement a second home screen 330, based on the second data, and display the second home screen 330 on the display 160. The first electronic device 101 may change the first home screen 320 to the second home screen 330 and display the second home screen 330 in response to completion of the backup function.

The first electronic device 101 may display the first home screen 320 based on the first data when the initial setup function is completed while the backup function is being executed, and may display the second home screen 330 based on the second data when the backup function is completed. The first electronic device 101 may primarily display the first home screen 320 even while the backup function is being executed and inform the user that the backup function is being executed. According to embodiments of the disclosure, reliability according to the execution of the backup function may be improved, and usability of the first electronic device 101 may be improved. The first electronic device 101 may at least partially execute other functions of the first electronic device 101 according to user input while displaying the first home screen 320 even when the backup function is being executed. Usability of the first electronic device 101 may therefore be improved.

Figure 4:
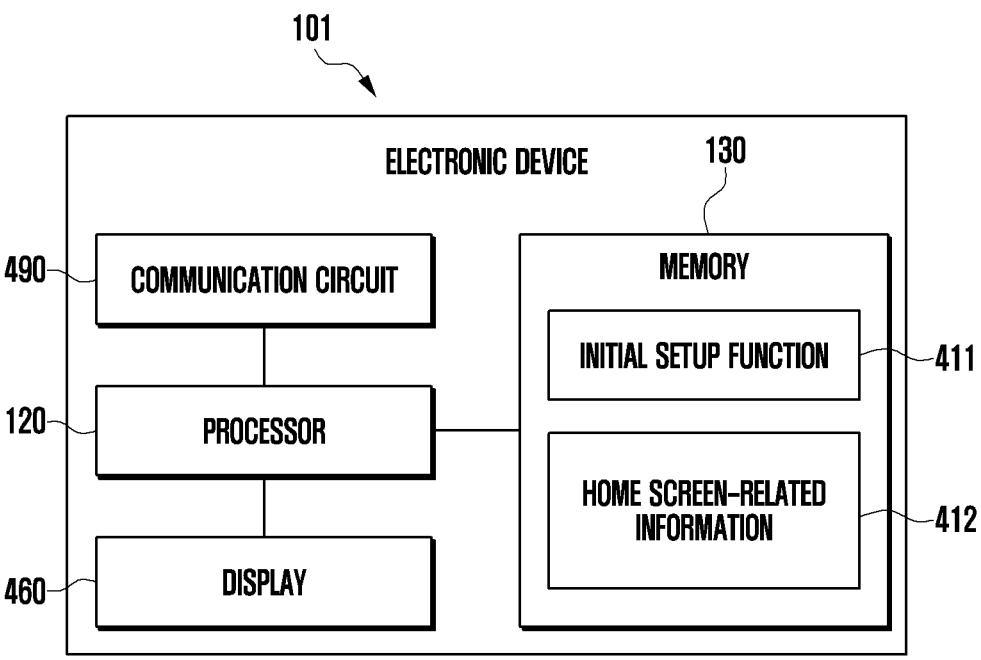
FIG. 4 is a block diagram of an electronic device according to an embodiment of the disclosure.

FIG. 4 is a block diagram of an electronic device according to an embodiment of the disclosure.

Referring to FIG. 4, the electronic device 101 (e.g., a new electronic device) in FIG. 4 may be at least partially similar to the electronic device 101 in FIG. 1 or may further include other embodiments of the electronic device 101. For example, the first electronic device 101 may include a new electronic device in an initialized state (e.g., an electronic device that obtains backup data based on the execution of a backup function).

The electronic device 101 may execute an initial setup function 411 in response to the situation in which power is turned on (e.g., power-on). For example, the initial setup function 411 may be a setup operation for the electronic device 101 to operate. The initial setup function 411 may include a "setup wizard function". The initial setup function 411 is a preset program and may be stored in a memory (e.g., the memory 130 in FIG. 1). The initial setup function 411 may be included as a partial operation of the backup function. For example, the electronic device 101 may execute an initial setup function 411 to display a first screen and then execute a backup function to transfer backup data, or may preferentially execute an initial setup function 411 while the backup function is being executed. The backup function may include a "smart switch function".

The electronic device 101 (e.g., a first electronic device) may execute the backup function while being operatively connected to an external electronic device (e.g., a second electronic device or the electronic device 102 or 104 in FIG. 1). For example, the backup function may include the initial setup function 411 (e.g., a "setup wizard function") and a backup function (e.g., a "smart switch function"). A processor (e.g., the processor 120 in FIG. 1) of the electronic device 101, in response to the execution of the initial setup function 411, may recognize the external electronic device operatively connected to the electronic device 101 and request first data for implementing a first home screen (e.g., the first home screen 320 in FIG. 3) from the external electronic device 102 and 104. For example, the first home screen may be implemented based on a home screen (e.g., the home screen 310 in FIG. 3) of the external electronic device 102 or 104. The external electronic device 102 or 104 may produce first data (e.g., information related to the home screen of the external electronic device 102 or 104, information related to an icon, list information of applications, information related to a lock screen, and information related to a background screen (e.g., wallpaper)) based on the home screen and provide the produced first data to the electronic device 101. The electronic device 101 may implement a first home screen, based on the first data and display the first home screen on a display 460 (e.g., the display module 160 in FIG. 1). For example, the first home screen may be implemented based on the size and specifications of the display 460 of the electronic device 101. The electronic device 101 may continue to display the first home screen and at least partially execute some functions based on the first home screen while the backup function is being executed.

When the initial setup function 411 is completed, the electronic device 101 may execute a backup function in which backup data (e.g., second data) stored in the external electronic device is transferred to the electronic device 101. For example, while a backup function is being executed, the electronic device 101 may display the first home screen and at least partially execute some functions based on the first home screen.

When the backup function is completed, the electronic device 101 may implement a second home screen (e.g., the second home screen 330 in FIG. 3), based on backup data (e.g., second data) and display the second home screen on the display 460. The electronic device 101 may switch from the first home screen to the second home screen. For example, the second home screen may include a screen that is substantially the same as the home screen of the external electronic device.

According to another embodiment of the disclosure, in the case of obtaining information related to the home screen (e.g., home screen layout information or display-related information) of the electronic device 101 (e.g., a new electronic device), the external electronic device 102 or 104 (e.g., an old electronic device) may implement a first home screen to be displayed in the electronic device 101, based on the obtained information, and also provide the first home screen to the electronic device 101. For example, in the case of transmitting a request signal for first data for configuring the first home screen to the external electronic device 102 or 104, the electronic device 101 may transmit information related to the display 460 of the electronic device 101 (e.g., size information, area information, home screen layout information, and wallpaper-related information thereof) together. The external electronic device 102 or 104 may produce a first home screen to be displayed in the electronic device 101 to conform to the size of the display 460, based on information related to the display 460 of the electronic device 101. The external electronic device 102 or 104 may provide the produced first home screen to the electronic device 101, and the electronic device 101 may display the first home screen on the display 460.

If the electronic device 101 and the external electronic device 102 or 104 have different shapes (e.g., a bar-shaped electronic device, a foldable electronic device, an electronic device having a single-display, or an electronic device having two or more displays), the electronic device 101 may display an option for selecting one of several display modes. For example, the external electronic device 102 or 104 may include a plurality of displays (e.g., a first display and a second display), and the electronic device 101 may include a single display. The electronic device 101 may be in the state of being operatively connected to the external electronic device 102 or 104 for execution of a backup function. When executing the backup function, the electronic device 101 may display an option screen for selecting one home screen (e.g., a main screen) from a plurality of home screens (e.g., a 1-1st screen and a 1-2nd screen) corresponding to the plurality of displays (e.g., the first display and the second display) of the external electronic device 102 or 104. If the user of the electronic device 101 selects the 1-1st screen as the main screen, the electronic device 101 may implement the 1-1st screen as the main screen. In this case, the 1-2nd screen may be implemented as a sub-screen or an initial setup screen. If the user of the electronic device 101 selects the 1-2nd screen as the main screen, the electronic device 101 may implement the 1-2nd screen as the main screen. In this case, the 1-1st screen may be implemented as a sub-screen or an initial setup screen. The electronic device 101 may configure one of the 1-1st screen and the 1-2nd screen as the main screen, based on information related to the display 460 (e.g., size and specifications).

As another example, the external electronic device 102 or 104 may include a single display, and the electronic device 101 may include a plurality of displays (e.g., a first display and a second display). The electronic device 101 may be in the state of being operatively connected to the external electronic device 102 or 104 for execution of a backup function. When executing the backup function, the electronic device 101 may display an option screen for determine whether to configure the home screen (e.g., a 1-3rd screen) displayed through single display of the external electronic device 102 or 104 as a main screen or a sub-screen. If the user of the electronic device 101 selects the 1-3rd screen (e.g., the home screen of the external electronic device 102 or 104) as the main screen, the electronic device 101 may display the 1-3rd screen through the first display configured as the main screen. In this case, the electronic device 101 may display an initial setup screen through the second display configured as the sub-screen. If the user of the electronic device 101 selects the 1-3rd screen (e.g., the home screen of the external electronic device 102 or 104) as the sub-screen, the electronic device 101 may display the 1-3rd screen through the second display configured as the sub-screen. In this case, the electronic device 101 may display an initial setup screen through the first display configured as the main-screen. The electronic device 101 may adjust the size of the 1-3rd screen, based on information related to the display 460 (e.g., size and specifications), and display the same.

If a theme package (e.g., a theme package file, a theme icon, or a theme background screen) is applied to the home screen of the external electronic device 102 or 104, the electronic device 101 may reflect the theme package-related content (e.g., a theme icon or a theme background screen) on the implemented home screen after completing the backup function is completed (for example, acquisition and installation of the theme-related application are completed). For example, while a backup function is being executed in relation to the home screen to which a theme package is applied, the electronic device 101 may display a home screen implemented based on the default screen and default icons. After the backup function is completed, the electronic device 101 may change the icons and the background screen constituting the home screen, based on the theme package, and display the same.

Referring to FIG. 4, the electronic device 101 may include a processor (e.g., the processor 120 in FIG. 1), a memory (e.g., the memory 130 in FIG. 1), a display 460 (e.g., the display module 160 in FIG. 1), and/or a communication circuit 490 (e.g., the communication module 190 in FIG. 1). The memory 130 may include an initial setup function 411 and home screen-related information 412 for driving the electronic device 101.

The processor 120 of the electronic device 101 may execute a program (e.g., the program 140 in FIG. 1 or the program 140 in FIG. 2) stored in the memory 130 to control at least one other component (e.g., hardware or software components) and perform various data processing or operations. The processor 120 may be operatively, functionally, and/or electrically connected to the memory 130, the display 460, and/or the communication circuit 490.

The memory 130 may store information related to an initial setup function 411 for operating the electronic device 101 and home screen-related information 412 for configuring the home screen. For example, the initial setup function 411 may include a function that is executed first when the electronic device 101 is turned on (e.g., booting) and include a "setup wizard function". The initial setup function 411 may be prestored in the memory 130 during the manufacturing process of the electronic device 101 and included as part of the backup function. The initial setup function 411 may be executed before the backup function (e.g., a function of transferring backup data) is executed or executed preferentially while the backup function is being executed.

The processor 120 may implement a home screen, based on the home screen-related information 412, and display the implemented home screen on the display 460. For example, home screen-related information 412 may include at least one piece of information for configuring the home screen, information related to the layout of the home screen, information related to wallpaper (e.g., a background screen), information related to a lock screen, information related to an application to be installed, information related to an icon of an application to be installed, and/or list information.

The display 460 (e.g., the display module 160 in FIG. 1) may display the implemented home screen in response to the execution of the initial setup function 411. For example, the processor 120 may display a first application that has been completely installed to be executable and a second application that has not yet been completely installed and is not executable in different colors from each other to visually distinguish between the first application and the second application. For example, the first icon corresponding to the first application and the second icon corresponding to the second application may be displayed to reflect visual effects so as to distinguish between them. The electronic device 101 may execute a backup function in response to completion of the initial setup function 411 and display a first home screen produced substantially at the same time based on the home screen-related information 412 on the display 460. If the screen displayed on the display 460 is the first home screen, the user may determine that a backup function is being executed in the background. Reliability according to the execution of the backup function may be improved.

The communication circuit 490 (e.g., the communication module 190 in FIG. 1) may support a communication connection between the electronic device 101 and an external electronic device (e.g., the electronic device 102 or 104 in FIG. 1 or the second electronic device 301 in FIG. 3). For example, the communication circuit 490 may include one or more communication processors (CPs) that support direct (e.g., wired) communication or wireless communication. The processor 120 may recognize an external electronic device operatively connected through the communication circuit 490 in response to the execution of the initial setup function. The processor 120 may transmit a signal requesting first data through the communication circuit 490 in response to the recognition of the external electronic device.

According to an embodiment of the disclosure, a first electronic device 101 may include a display 460 (e.g., the display module 160 in FIG. 1), a communication circuit 490 (e.g., the communication module 190 in FIG. 1), a memory 130 (e.g., the memory 130 in FIG. 1), and a processor 120 operatively connected to the display 460, the communication circuit 490, and the memory 130. The processor 120 may execute an initial setup function 411 for initial setup of the first electronic device 101 (e.g., a new electronic device). The processor 120 may recognize a second electronic device (e.g., an old electronic device) that is operatively connected through the communication circuit 490 in response to the execution of the initial setup function 411. The processor 120 may request first data from the recognized second electronic device. The processor 120 may obtain first data produced by the second electronic device from the second electronic device. In response to the completion of the initial setup function 411, the processor 120 may display a first home screen implemented based on the obtained first data on the display 460 and request second data corresponding to the application stored in the second electronic device from the second electronic device. The processor 120 may obtain second data from the second electronic device. The processor 120 may display a second home screen implemented based on the obtained second data on the display 460.

According to an embodiment, the first data is home screen-related information 412 for implementing the home screen, and may include at least one piece of information related to the layout of the home screen, information related to wallpaper, information related to a lock screen, information related to an application to be installed, information related to an icon of an application to be installed, and/or list information.

According to an embodiment, the processor 120 may display the first home screen implemented based on the initial setup function on the display 460 in response to the execution of the initial setup function. The processor 120 may execute a backup function in response to the completion of the initial setup function. In response to the execution of the backup function, the processor 120 may change the first home screen being displayed on the display 460 to the second home screen implemented based on the backup function.

According to an embodiment, the processor 120 may execute an initial setup function 411 in response to a situation in which the first electronic device 101 is booted.

According to an embodiment, the initial setup function 411 may be executed based on a first application (e.g., a setup wizard-related application) related to initial setup of the first electronic device 101. The backup function may be executed based on a second application (e.g., a smart switch-related application) related to acquisition of second data corresponding to the backup data. The first application and the second application may be stored in the memory 130.

According to an embodiment, the first home screen may include a first icon corresponding to an application that has not yet been completely installed in the first electronic device 101 and a second icon corresponding to an application that has been completely installed in the first electronic device 101, and the first icon is characterized in that it is displayed as a dummy icon.

According to an embodiment, the first home screen may include a widget area for displaying widget content. In the case where an application corresponding to widget content is not installed, the processor 120 may display the widget area to be visually distinguished from the remaining area of the first home screen. For example, the widget area may be displayed in a block form, as a partial space of the first home screen where widget content is to be displayed, without widget content.

According to an embodiment, the processor 120 may identify installation of an application corresponding to widget content in response to the execution of the backup function. The processor 120 may display widget content, based on the widget area, in response to completion of installation of the application corresponding to the widget content.

According to an embodiment, the processor 120 may identify the priority corresponding to at least one application included in the first screen in response to the execution of the backup function. The processor 120 may install at least one application, based on the identified priority. The processor 120 may change the first icon corresponding to at least one application to a second icon in response to completion of installation of at least one application.

According to an embodiment, the processor 120 may display a notification message indicating that the application corresponding to the first icon is performing the backup function in response to a user input to the first icon.

FIG. 5 is a flowchart illustrating a method of restoring a home screen in a first electronic device according to an embodiment of the disclosure.

Referring to FIG. 5, respective operations may be performed sequentially, but this is not required. For example, the sequence of the respective operations may vary, and at least two operations may be performed in parallel.

Operations 501 to 515 may be understood to be performed by a processor (e.g., the processor 120 in FIGS. 1 and 4) of an electronic device (e.g., the electronic device 101 in FIGS. 1 and 4).

The electronic device 101 in FIG. 5 may be at least partially similar to the first electronic device 101 in FIG. 3 or may further include other embodiments of the electronic device. For example, the first electronic device 101 may include a new electronic device in an initialized state (e.g., an electronic device that obtains backup data based on the execution of a backup function).

The first electronic device 101 may execute a backup function while being operatively connected to a second electronic device (e.g., an external electronic device, the electronic device 102 or 104 in FIG. 1, or an old electronic device that provides backup data based on execution of a backup function). For example, the first electronic device 101 may sequentially execute an initial setup function (e.g., the initial setup function 411 stored in the memory 130 in FIG. 4) and a backup function. A processor (e.g., the processor 120 in FIG. 1) of the first electronic device 101 may recognize the second electronic device in response to the execution of the initial setup function 411 and request first data for implementing a first home screen from the second electronic device. For example, the first home screen may be implemented based on a home screen of the second electronic device. The second electronic device may produce first data based on the home screen and provide the produced first data to the first electronic device 101. The first electronic device 101 may implement a first home screen based on the first data and display the implemented first home screen on a display (e.g., the display 460 in FIG. 4). When the initial setup function is completed, the first electronic device 101 may execute a backup function to obtain second data. While the backup function is being executed, the first electronic device 101 may continue to display the first home screen and at least partially execute some functions based on the first home screen.

When the initial setup function 411 of the first electronic device 101 is completed, a backup function may be executed to transfer backup data (e.g., second data) stored in the second electronic device to the first electronic device 101. For example, while the backup function is being executed, the first electronic device 101 may display the first home screen on the display 460 and at least partially execute some functions based on the first home screen. In an embodiment, if the first home screen is displayed on the display 460, the user may recognize that the first electronic device 101 is performing the backup function.

If the backup function is completed, the first electronic device 101 may implement a second home screen based on backup data (e.g., second data) and display the second home screen on the display 460. The first electronic device 101 may switch from the first home screen to the second home screen. For example, the second home screen may be implemented as a screen that is substantially the same as the home screen of the second electronic device.

Referring to FIG. 5, in operation 501, the processor 120 of a first electronic device 101 may execute an initial setup function 411 in response to an operation in which the first electronic device 101 is turned on (e.g., booting). For example, the processor 120 may execute a first application related to initial setup (e.g., an application that executes a "setup wizard function") and execute the initial setup function 411, based on the first application. For example, the initial setup function 411 may include an operation for the first electronic device 101 to display the home screen. The initial setup function 411 may include some functions included in the backup function. For example, the first application may include at least one function among a plurality of functions including a call activation function, a Wi-Fi (wireless fidelity) setting function, a migration function, an account input function, a predetermined service setting function, a screen lock setting function, and/or a digital security setting function.

In operation 503, the processor 120 may recognize a second electronic device (e.g., the second electronic device 301 in FIG. 3) that is operatively connected to the first electronic device 101. For example, the first electronic device 101 may be in the state of being operatively connected to the second electronic device 301 through a communication circuit (e.g., the communication circuit 490 in FIG. 4). The processor 120 may identify the connection with the second electronic device in response to the execution of the initial setup function 411.

In operation 505, the processor 120 may transmit a first signal requesting first data to the second electronic device. For example, in configuring the first home screen based on the initial setup function 411, the processor 120 may request first data (e.g., information related to the home screen of the second electronic device) from the second electronic device. The first electronic device 101 and the second electronic device may be executing the initial setup function 411 included in the backup function. Before obtaining backup data based on the backup function (e.g., before executing the backup function), the processor 120 may initially request first data for configuring the first home screen from the second electronic device. In response to reception of the first signal, the second electronic device may collect information related to the home screen being displayed on the display (e.g., the home screen of the second electronic device) and produce first data based on the collected information. For example, the information related to the home screen may include at least one piece of information for configuring the home screen, information related to the layout of the home screen, information related to wallpaper (e.g., a background screen), information related to a lock screen, information related to an application to be installed, information related to an icon of an application to be installed, and/or list information. The first data may be produced in the form of a package file. The second electronic device may provide the produced first data to the first electronic device 101 in response to the reception of the first signal.

In operation 507, the processor 120 may obtain the first data produced by the second electronic device from the second electronic device. For example, the first electronic device 101 may obtain the first data while the initial setup function is being executed and implement the first home screen based on the obtained first data.

In operation 509, the processor 120 may display the first home screen implemented based on the obtained first data on the display 460. The processor 120 may display the first home screen implemented based on the obtained first data on the display 460 in response to completion of the initial setup function 411. For example, the first home screen may be implemented substantially similar to the home screen of the second electronic device. The first home screen may be implemented based on icons and widget content corresponding to multiple applications.

The processor 120 may distinguish between an installed application that has been completely installed in the memory 130 and an uninstalled application that has not yet been completely installed in the memory 130. For example, if a first icon corresponding to the installation application that has been completely installed in the first electronic device 101 is included in the first home screen, the first icon may be displayed as an icon image produced in a configured color and form. If a second icon corresponding to the uninstalled application that has not yet been completely installed in the first electronic device 101 is included in the first home screen, the second icon may be displayed as a dummy icon image in the form of a dummy image. For example, a dummy icon image may include an icon displayed only in black and white. If a dummy icon image is displayed on the first home screen, the user may determine that the corresponding application has not yet been completely installed. As another example, if widget content corresponding to the uninstalled application that has not yet been completely installed in the first electronic device 101 is included in the first home screen, the area in which the widget content is to be disposed may be displayed in the form of a block or by reflecting a visual effect (e.g., widget content configured only in black and white, such as a dummy image) so as to identify the area. After the backup function is completed (e.g., installation in the first electronic device 101 is completed), the widget content may be implemented in a configured color and configured form, based on the corresponding area in the second home screen.

The first electronic device 101 may display a dummy icon on the first home screen, thereby indicating that the application corresponding to the dummy icon has not yet been completely installed (e.g., an uninstalled state) in the first electronic device 101. In an embodiment, when the first home screen is displayed on the display 460, the user may determine that a backup function is being executed in the first electronic device 101.

In operation 511, in response to completion of the initial setup function 411, the processor 120 may transmit a second signal requesting second data corresponding to the application (e.g., backup data related to the application) stored in the second electronic device to the second electronic device. For example, in response to completion of the initial setup function 411, the processor 120 may execute a backup function based on a second application related to the backup function (e.g., an application that executes a "smart switch function"). As another example, in response to completion of the initial setup function 411, the processor 120 may also execute a second application related to the backup function (e.g., an application that executes a "smart switch function") and also execute the backup function based on the second application. In response to completion of the initial setup function 411, the processor 120 may display the first home screen implemented based on the first data in operation 509 and request second data from the second electronic device in operation 511. Operations 509 and 511 may be performed in parallel in response to the completion of the initial setup function 411.

Referring to FIG. 5, operations 501 to 509 may include operations based on the initial setup function included in the backup function. Operations 511 to 515 may include operations based on the backup function (e.g., a function for transferring backup data) included in the backup function. For example, the processor 120 may identify the application corresponding to the icon (e.g., a dummy icon) and widget content included in the first home screen, and request backup data (e.g., second data) related to the identified application from the second electronic device. According to an embodiment, the second electronic device may provide second data (e.g., backup data) to the first electronic device 101 in response to reception of the second signal.

In operation 513, the processor 120 may obtain the second data from the second electronic device as a response signal to the second signal. For example, the second data may include backup data according to the backup function and include data related to the installation and execution of at least one application.

In operation 515, the processor 120 may display a second home screen implemented based on the obtained second data on the display 460. For example, the second home screen may be implemented substantially the same as the home screen of the second electronic device. In an embodiment, the first electronic device 101 may implement a user environment such that the user interface settings of the second electronic device are substantially identically reflected by executing the backup function. Usability according to the use of the first electronic device 101 may be improved. The processor 120 may implement the icons and widget content included in the second home screen, based on the second data. The icons included in the second home screen may be icons based on configured colors and forms, instead of dummy icons. The processor 120 may display the second home screen on the display 460 in response to completion of the backup function. When the second home screen is displayed on the display 460, the user may recognize that the backup function has been completed in the first electronic device 101.

The first electronic device 101 may initially display a first home screen based on first data (e.g., initial setup data) in response to completion of the initial setup function and secondarily display a second home screen based on second data (e.g., backup data) in response to completion of the backup function. Based on the home screen being displayed on the display 460, the user may intuitively determine whether the backup function (e.g., the initial setup function) is being executed or whether the backup function has been completed in the first electronic device 101. According to embodiments of the disclosure, usability of the first electronic device 101 may be improved in relation to the execution of the backup function. Even while the backup function is being executed, the user may at least partially utilize the first electronic device 101, so that continuity according to utilization of the first electronic device 101 may be improved. While the backup function is executed, the data utilized in the first electronic device 101 may not be lost, and convenience in using the first electronic device 101 may be improved.

Figure 6:
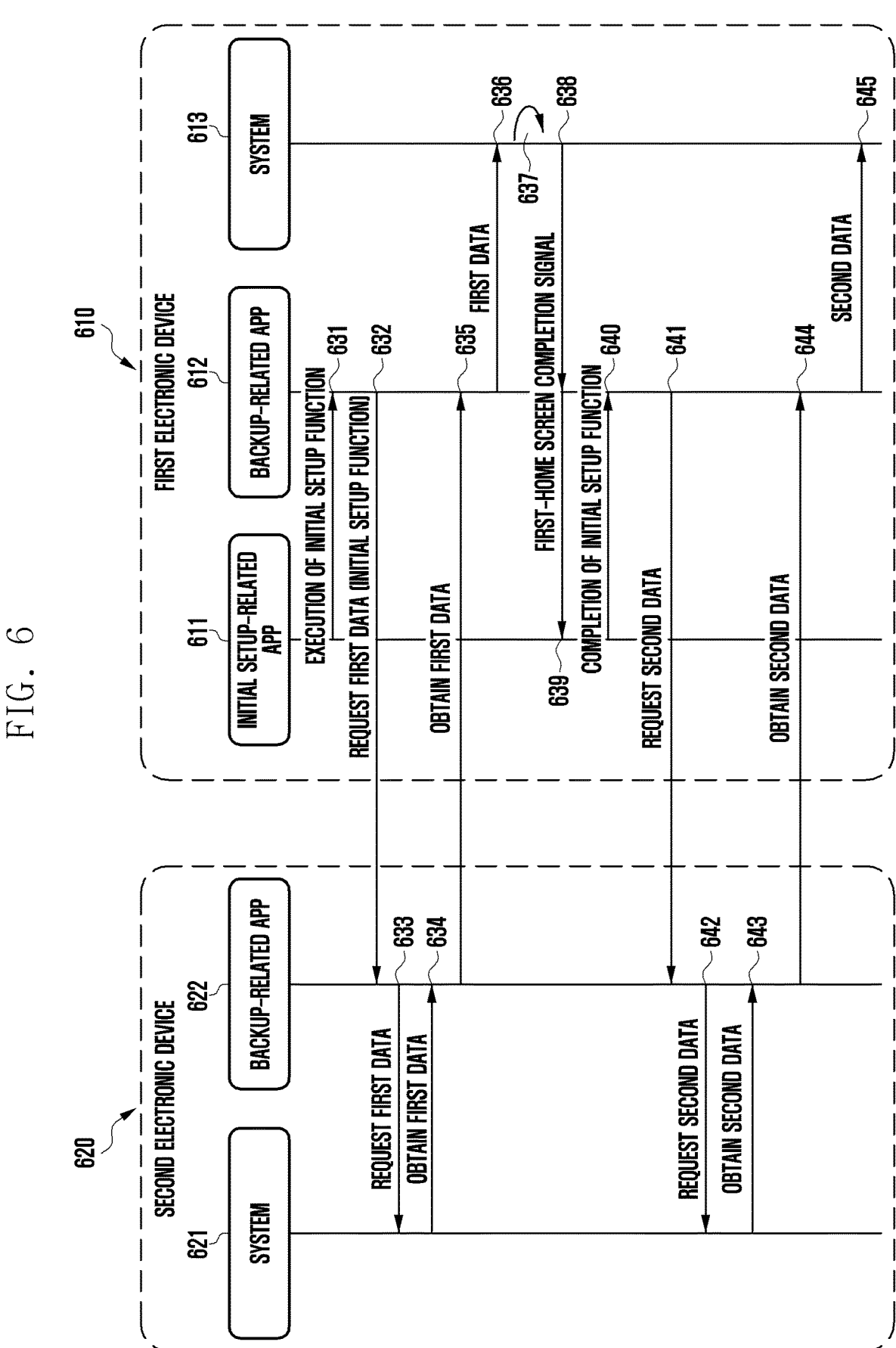
FIG. 6 is a diagram illustrating a time table corresponding to a method for restoring a home screen according to an embodiment of the disclosure.

FIG. 6 is a diagram illustrating a time table corresponding to a method for restoring a home screen according to an embodiment of the disclosure.

Referring to FIG. 6, respective operations may be performed sequentially, but this is not required. For example, the sequence of the respective operations may vary, and at least two operations may be performed in parallel.

A first electronic device 610 in FIG. 6 may be at least partially similar to the electronic device 101 in FIG. 1 and the first electronic device 101 in FIG. 3 or may further include other embodiments of the electronic device 101. A second electronic device in FIG. 6 may be at least partially similar to the electronic device 102 or 104 in FIG. 1 and the second electronic device 301 in FIG. 3 or may further include other embodiments of the second electronic device 301. For example, the first electronic device 610 may include a new electronic device in an initialized state (e.g., an electronic device that obtains backup data based on the execution of a backup function), and the second electronic device 620 may include an old electronic device that has been previously used (e.g., an electronic device that provides backup data based on the execution of a backup function).

Referring to FIG. 6, the first electronic device 610 (e.g., the electronic device 101 in FIG. 4) may include an initial setup-related application (APP) 611, a backup-related application 612, and a system 613, and the second electronic device 620 may include a backup-related application 622 and a system 621. For example, the initial setup-related application 611 may execute an initial setup function, and the backup-related application 612 may execute a backup function. The system 613 may implement a home screen using data and display the implemented home screen on a display (e.g., the display 460 in FIG. 4). The first electronic device 610 and the second electronic device 620 may be operatively connected to each other and executing the backup function. For example, the first electronic device 610 and the second electronic device 620 may be executing the backup function in which at least some of the data stored in the second electronic device 620 is provided to the first electronic device 610.

A processor (e.g., the processor 120 in FIG. 4) of the first electronic device 610 may execute an initial setup-related application 611 for initial setup in response to an operation in which power is turned on (e.g., booting). For example, the initial setup-related application 611 may include at least one function among a plurality of functions including a call activation function, a Wi-Fi (wireless fidelity) setting function, a migration function, an account input function, a predetermined service setting function, a screen lock setting function, and/or a digital security setting function.

Referring to FIG. 6, in operation 631, the initial setup-related application 611 may execute an initial setup function and transmit a signal related to the initial setup function to the backup-related application 612. For example, the initial setup-related application 611 may require first data when implementing a first home screen for initial setup and transmit a signal related to the initial setup function to the backup-related application 612.

In operation 632, the backup-related application 612 may transmit a first signal requesting first data to the second electronic device 620 in response to the execution of the initial setup function. For example, the backup-related application 612 of the first electronic device 610 and the backup-related application 622 of the second electronic device 620 may be substantially similar programs. The first electronic device 610 may identify whether or not the first electronic device 610 and the second electronic device 620 are operatively connected to each other in response to the execution of the initial setup function. The first electronic device 610 may recognize the second electronic device 620 and transmit a first signal requesting first data to the second electronic device 620.

In operation 633, the backup-related application 622 of the second electronic device 620 may request first data from the system 621 in response to reception of the first signal requesting the first data. For example, the first data may include information related to the home screen, and the information related to the home screen may include at least one piece of information for configuring the home screen, information related to the layout of the home screen, information related to wallpaper (e.g., a background screen), information related to a lock screen, information related to an application to be installed, information related to an icon of an application to be installed, and/or list information. The system 621 of the second electronic device 620 may extract information related to the home screen, based on the home screen being displayed on the display, in response to the request for first data and produce first data including the extracted information. For example, the first data may be produced in the form of a package file.

In operation 634, the system 621 of the second electronic device 620 may provide the produced first data to the backup-related application 622. In operation 635, the backup-related application 622 of the second electronic device 620 may transmit the first data to the backup-related application 612 of the first electronic device 610. In operation 635, the first electronic device 610 may obtain the first data (e.g., information for implementing the first home screen) from the second electronic device 620.

In operation 636, the backup-related application 612 of the first electronic device 610 may provide the first data to the system 613.

In operation 637, the system 613 may produce a first home screen, based on the provided first data, and display the produced first home screen on a display (e.g., the display 460 in FIG. 4). For example, the first home screen may be implemented based on the home screen being displayed on the second electronic device 620. For example, among the icons included in the first home screen, the icon corresponding to an application (e.g., an uninstalled application) that has not yet been completely installed in the first electronic device 610 may be displayed as a dummy icon in the form of a dummy image. For example, in relation to widget content included in the first home screen, if the widget content corresponds to an application (e.g., an uninstalled application) that has not yet been completely installed in the first electronic device 610, the system 613 may display the area where the widget content is to be displayed in the form of a block or by reflecting a visual effect on the widget content (e.g., widget content configured only in black and white such as a dummy image). The area where the widget content is to be displayed may be displayed to be visually distinct from the remaining areas. As another example, in relation to widget content included in the first home screen, if the widget content corresponds to an application (e.g., an installation application) that has been completely installed in the first electronic device 610, the system 613 may display widget content that reflects configured colors and forms on the first home screen.

With respect to widget content included in the first home screen, the system 613 may display the area where the widget content is to be displayed in the form of a block or display widget content that reflects a visual effect such as a dummy icon, based on the first data. The area where widget content is to be displayed may be displayed to be visually distinct from the remaining areas. As a result, when the first home screen is displayed, the user may intuitively identify the area and location where widget content is to be displayed.

In operation 638, the system 613 may transmit a signal including that the first home screen has been implemented based on the first data to the backup-related application 612.

In operation 639, the backup-related application 612 may transmit the signal indicating the implementation of the first home screen to the initial setup-related application 611. For example, the initial setup-related application 611 may identify that the first home screen has been implemented.

In operation 640, the initial setup-related application 611 may identify the implementation of the first home screen according to the initial setup function and transmit a signal indicating that the initial setup function has been completed to the backup-related application 612. For example, after operation 640 is performed, the execution of the initial setup-related application 611 may be terminated.

In operation 641, the backup-related application 612 may transmit a second signal requesting second data (e.g., backup data) to the second electronic device 620 in response to the termination of execution of the initial setup-related application 611 after completion of the initial setup function. In response to reception of the signal indicating that the initial setup function has been completed, the first electronic device 610 may display a notification message (e.g., a confirm button) indicating that the initial setup function has been completed on the display 460. The first electronic device 610 may identify user input related to the notification message and, in response to the identification, terminate execution of the initial setup-related application 611.

In operation 642, the backup-related application 622 of the second electronic device 620 may request second data from the system 621 in response to reception of the second signal requesting second data. For example, the second data includes backup data according to the backup function and may include data related to installation and execution of at least one application. The system 621 of the second electronic device 620 may produce second data including data related to installation and execution of the at least one application in response to the request for second data.

In operation 643, the system 621 of the second electronic device 620 may provide the produced second data to the backup-related application 622.

In operation 644, the backup-related application 622 of the second electronic device 620 may provide the second data to the backup-related application 612 of the first electronic device 610. In operation 644, the backup-related application 612 of the first electronic device 610 may obtain the second data (e.g., information for implementing the second home screen or backup data) from the backup-related application 622 of the second electronic device 620.

In operation 645, the backup-related application 612 of the first electronic device 610 may provide the second data to the system 613. The system 613 may produce a second home screen based on the second data and display the produced second home screen on the display 460. For example, the second home screen may be implemented substantially the same as the home screen being displayed on the second electronic device 620. According to an embodiment, the first electronic device 610 may display the second home screen in response to completion of the backup function.

When the first home screen is displayed on the display 460 of the first electronic device 610, the user may identify that the backup function is being executed in the first electronic device 610. When the second home screen is displayed on the display 460 of the first electronic device 610, the user may identify that the backup function has been completed in the first electronic device 610.

According to an embodiment of the disclosure, while the backup function is being executed, the first electronic device 610 may perform installation and execution of a first program (e.g., a 3rd party application or an application newly installed in the first electronic device 610), based on user input. For example, when the installation of the first program is completed, the first electronic device 610 may update information related to the installation of the first program when displaying the second home screen. For example, an icon corresponding to the first program may be added to the second home screen, and the added second home screen may be displayed.

According to another embodiment of the disclosure, if the first home screen is edited (e.g., deletion of a dummy icon or deletion of widget content) while the backup function is being executed, the first electronic device 610 may reflect the editing information on the second home screen when displaying the second home screen. If editing information according to user input occurs while the backup function is being executed, the first electronic device 610 may produce a second home screen reflecting the editing information. For example, if a dummy icon included in the first home screen is deleted, the first electronic device 610 may maintain the installation of the application corresponding to the deleted dummy icon through the backup function being executed. For example, if the installation of the application corresponding to the deleted dummy icon is completed, the first electronic device 610 may display an icon of the application whose installation has been completed on the second home screen. The first electronic device 610 may display the icon (e.g., the icon of the application corresponding to the deleted dummy icon) as an icon that is produced last, among the icons included in the second home screen. As another example, if widget content included in the first home screen is deleted, the first electronic device 610 may delete the block image for the area where the widget content is to be displayed, based on the first home screen. As another example, the first electronic device 610 may maintain the installation of the application corresponding to the deleted widget content through the backup function being executed, but may not perform an operation of restoring and displaying the widget content. If editing information related to the first home screen (e.g., deletion of a dummy icon, deletion of widget content, or installation of a new application) occurs, the first electronic device 610 may produce a second home screen reflecting the editing information.

The first electronic device 610 may provide a continuous user experience to the user. In an embodiment, the user's convenience in using the first electronic device 610 may be improved.

When the first electronic device 610 requests first data from the second electronic device 620 in operation 632, the first electronic device 610 may transmit information related to the display 460 of the first electronic device 610 (e.g., size information, area information, home screen layout information, and wallpaper-related information) together. For example, the second electronic device 620 may also produce a first home screen to be displayed on the electronic device 610 so as to conform to the size of the display 460, based on the information related to the display 460 of the first electronic device 610. When transmitting first data to the first electronic device 610 in operation 635, the second electronic device 620 may also provide the produced first home screen, and the first electronic device 610 may display the first home screen produced by the second electronic device 620 on the display 460.

If the first electronic device 610 and the second electronic device 620 have different shapes (e.g., they have different form factors (e.g., a bar-shaped electronic device, a foldable electronic device, an electronic device having a single-display, or an electronic device having two or more displays)), the first electronic device 610 may display an option for selecting one of several display modes. For example, the second electronic device 620 may be an electronic device including a plurality of displays (e.g., a first display and a second display), and the first electronic device 610 may be an electronic device including a single display. When executing the backup function for the second electronic device 620, the first electronic device 610 may display an option for selecting one home screen (e.g., a main screen) from among a plurality of home screens (e.g., a 1-1st screen and a 1-2nd screen) corresponding to the plurality of displays (e.g., a first display and a second display) of the second electronic device 620. If the user selects the 1-1st screen as a main screen, the first electronic device 610 may configure the 1-1st screen as a main screen and configure the 1-2nd screen as a sub-screen. If the user selects the 1-2nd screen as a main screen, the first electronic device 610 may configure the 1-2nd screen as a main screen and configure the 1-1st screen as a sub-screen. The first electronic device 610 may configure one of the 1-1st screen and the 1-2nd screen as a main screen, based on information related to the display 460 (e.g., size information, area information, and specification information).

Figure 7:
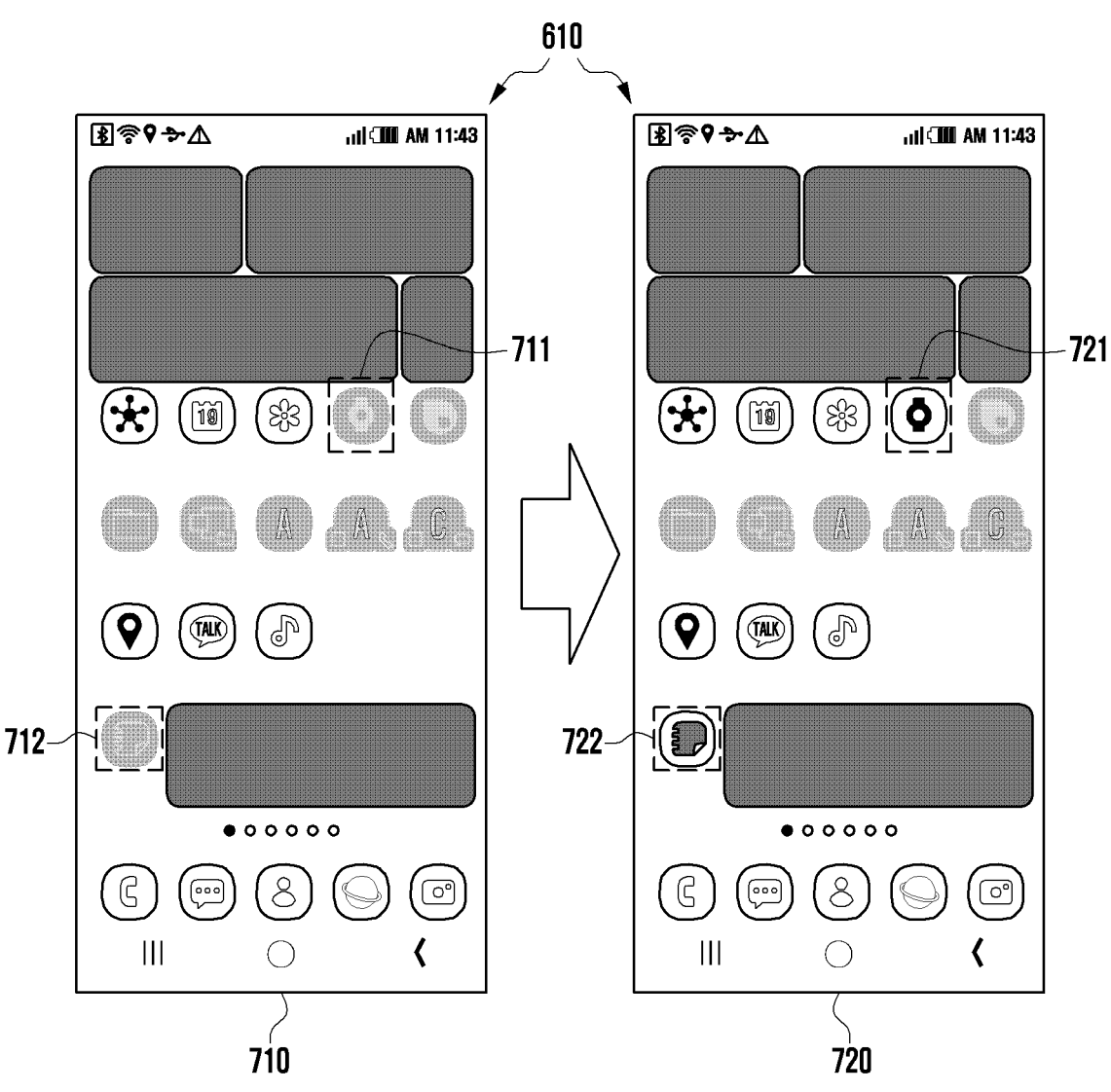
FIG. 7 is a diagram in which a default app is preferentially restored so that a home screen is displayed based on the restored default app according to an embodiment of the disclosure.

FIG. 7 is a diagram in which a default app is preferentially restored so that a home screen is displayed based on the restored default app according to an embodiment of the disclosure.

Referring to FIG. 7, a first electronic device 610 in FIG. 7 may be at least partially similar to the electronic device 101 in FIG. 1 and the first electronic device 101 in FIG. 3 or may further include other embodiments of the electronic device 101. For example, the first electronic device 610 may include a new electronic device in an initialized state (e.g., an electronic device that obtains backup data based on the execution of a backup function).

Referring to FIG. 7, the first electronic device 610 may display a first home screen 710 on a display (e.g., the display 460 in FIG. 4) in the state in which the initial setup function has been completed. The first electronic device 610 may remain in the state of executing the backup function in the background. For example, first icons 711 and 712 corresponding to first applications that have not yet been completely installed in the first electronic device 610 may be displayed as dummy icons on the first home screen 710. For example, the dummy icons 711 and 712 may include icons displayed only in black and white. The user may identify the dummy icons 711 and 712 included in the first home screen 710 and identify that the first electronic device 610 is executing the backup function. For example, when the installation of the first application is completed, the first icons 711 and 712 may switch to second icons 721 and 722 reflecting configured colors and forms and may be displayed. The first electronic device 610 may change the first home screen 710 to the second home screen 720 and display the same.

The first electronic device 610 may restore or install applications, based on a configured priority when executing a backup function included in the backup function. For example, a default application related to the manufacturer of the first electronic device 610 may be configured to have higher priority. When executing the backup function, the first electronic device 610 may install a default application having higher priority faster than other applications, and may switch at least one icon corresponding to the completely installed application from the first icon 711 or 712 (e.g., a dummy icon) to the second icon 721 or 722 (e.g., an icon produced based on a configured color and form) and display the same.

The first electronic device 610 executing the backup function may update the second home screen 720 according to a configured time interval and display the updated second home screen 720 on the display 460.

Figure 8A:
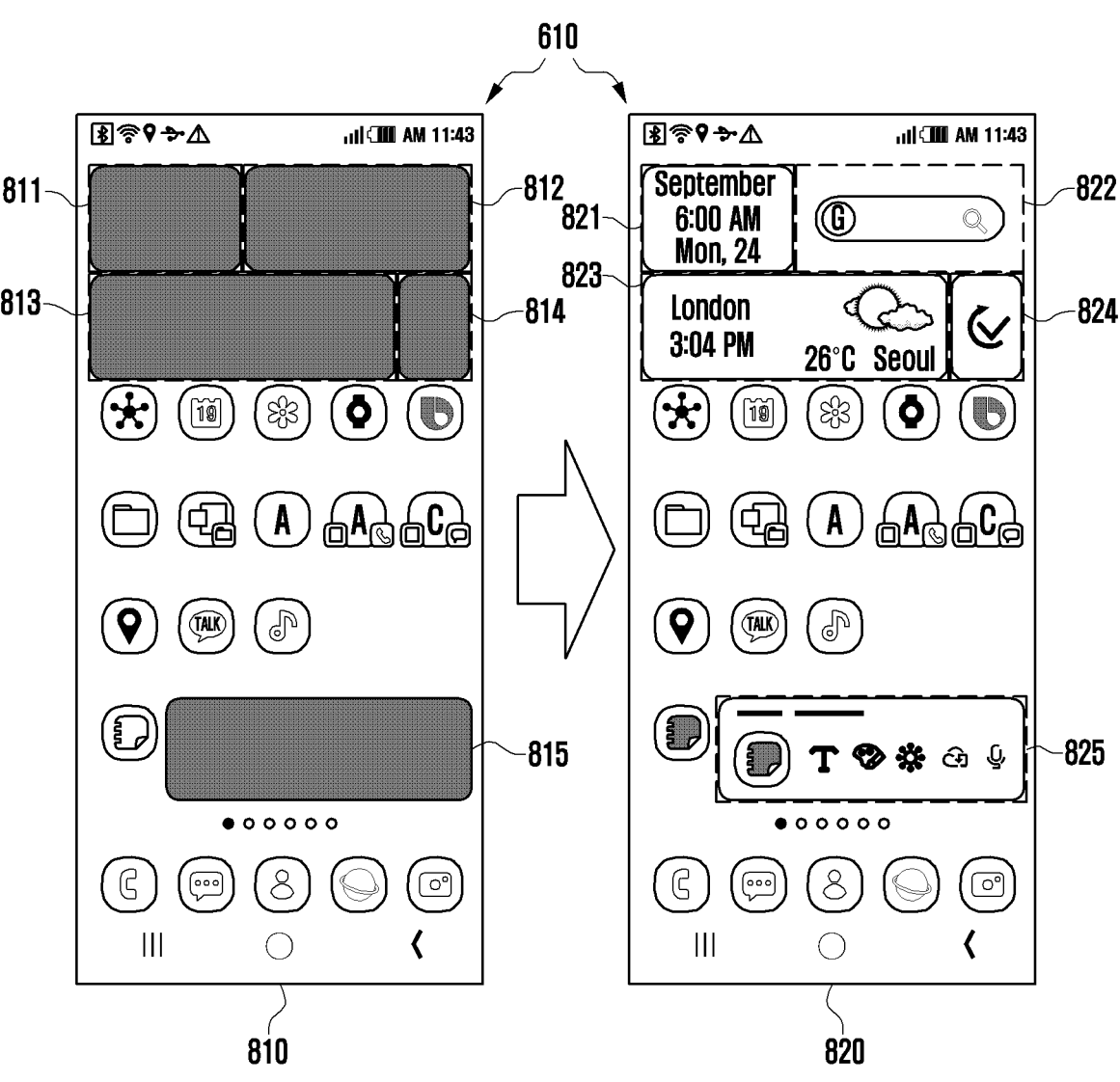
FIG. 8A is a diagram of a first embodiment in which widget content is activated and displayed on a home screen after a backup function of a widget-related app is completed according to an embodiment of the disclosure.

FIG. 8A is a diagram of a first embodiment in which widget content is activated and displayed on a home screen after a backup function of a widget-related app is completed according to an embodiment of the disclosure.

Figure 8B:
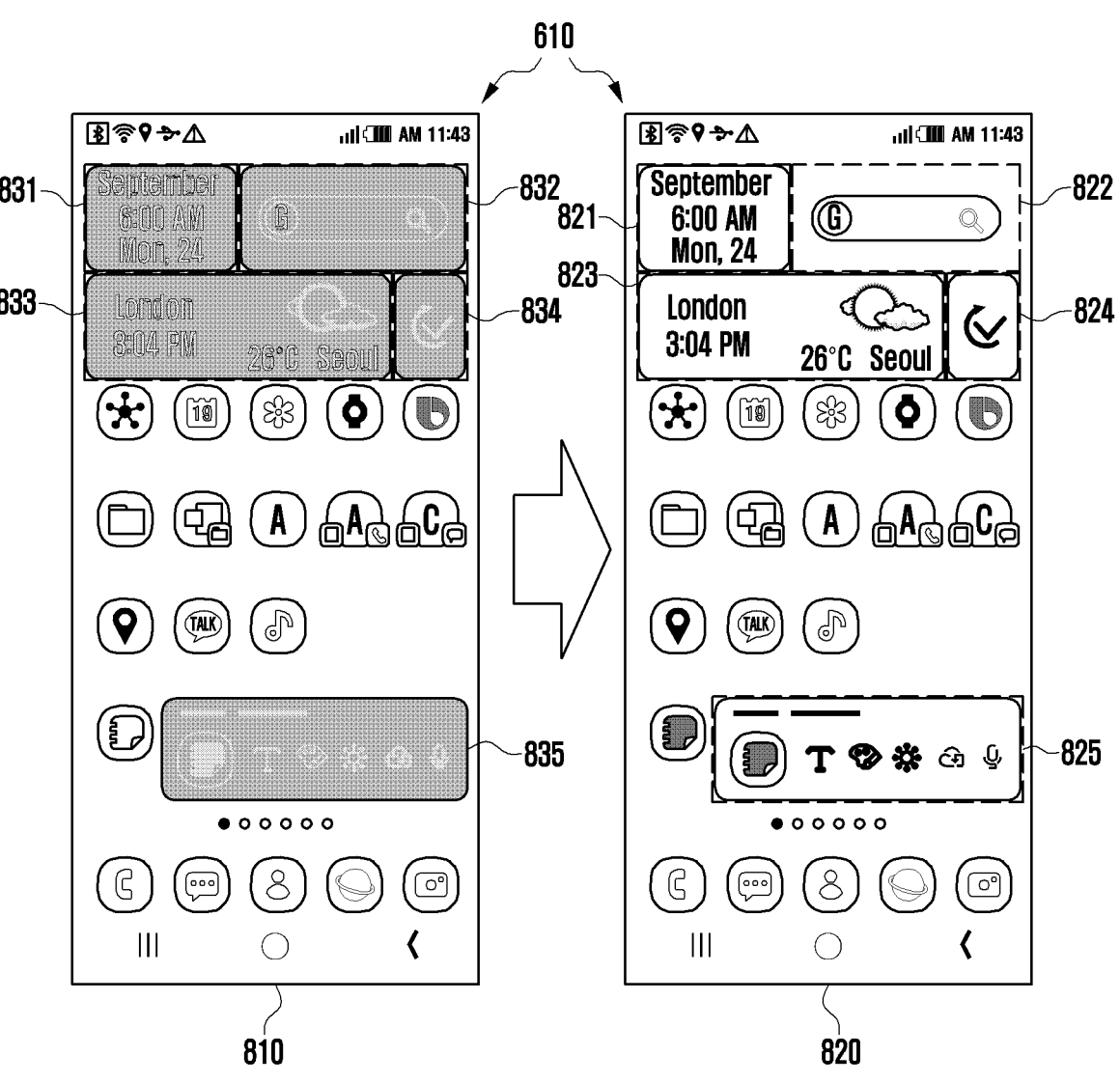
FIG. 8B is a diagram of a second embodiment in which widget content is activated and displayed on a home screen after a backup function of a widget-related app is completed according to an embodiment of the disclosure.

FIG. 8B is a diagram of a second embodiment in which widget content is activated and displayed on a home screen after a backup function of a widget-related app is completed according to an embodiment of the disclosure.

Referring to FIGS. 8A and 8B, a first electronic device 610 in FIGS. 8A and 8B may be at least partially similar to the electronic device 101 in FIG. 1 and the first electronic device 101 in FIG. 3 or may further include other embodiments of the electronic device 101. For example, the first electronic device 610 may include a new electronic device in an initialized state (e.g., an electronic device that obtains backup data based on the execution of a backup function).

Referring to FIGS. 8A and 8B, the first electronic device 610 may display a first home screen 810 on a display (e.g., the display 460 in FIG. 4) in the state in which the initial setup function has been completed. The first electronic device 610 may remain in the state of executing the backup function in the background. Referring to FIG. 8A, widget areas 811, 812, 813, 814, and 815 where at least one piece of widget content is to be displayed may be displayed, on the first home screen 810, as block-shaped images to be visually distinguished from the remaining areas. The widget areas 811, 812, 813, 814, and 815 shown in FIG. 8A may include an area where widget content of an uninstalled application that has not yet been completely installed is displayed. Referring to FIG. 8B, on the first home screen 810, widget content 831, 832, 833, 834, and 835 in the form of a dummy icon may be displayed in the areas where at least one piece of widget content is displayed. The widget content 831, 832, 833, 834, and 835 shown in FIG. 8B may indicate that the applications corresponding to the widget content have not yet been completely installed. When the widget content is displayed in the form of a block or dummy icon, the widget content may be identified as widget content in an inactive state.

For example, when installation of a calendar-related application is completed, the first electronic device 610 may display first widget content 821 including date and time information, based on a first widget area 811. When installation of a search portal-related application is completed, the first electronic device 610 may display second widget content 822 including a search box, based on a second widget area 812. When installation of a weather-related application is completed, the first electronic device 610 may display 3-1st widget content 823 including weather information, based on a 3-1st widget area 813. When the installation of the weather-related application is completed, the first electronic device 610 may display 3-2nd widget content 824 including an icon for updating weather information, based on a 3-2nd widget area 814. When installation of a notepad-related application is completed, the first electronic device 610 may display fourth widget content 825 including an option icon related to creating a notepad, based on a fourth widget area 815.

According to an embodiment of the disclosure, the first electronic device 610 executing the backup function may display a first home screen 810 in which widget areas to display widget content are visually distinguished. When the backup function is completed, the first electronic device 610 may display a second home screen 820 including widget content.

According to another embodiment of the disclosure, a plurality of applications corresponding to widget content may have priorities configured therefor, and the installation order of the applications may be determined according to the configured priorities when executing the backup function. According to another embodiment, the first electronic device 610 executing the backup function may identify whether or not the application is installed at a configured time interval (e.g., a configured cycle) and, if a completely installed application is identified, display widget content corresponding to the completely installed application in a configured color and form. According to another embodiment, the first electronic device 610 may activate widget content in order of priority and display the widget content implemented in configured colors and configured forms. According to another embodiment, the first electronic device 610 may activate and display widget content corresponding to an application that has been completely installed, among the widget content included in the home screen, at configured time intervals.

Figure 9:
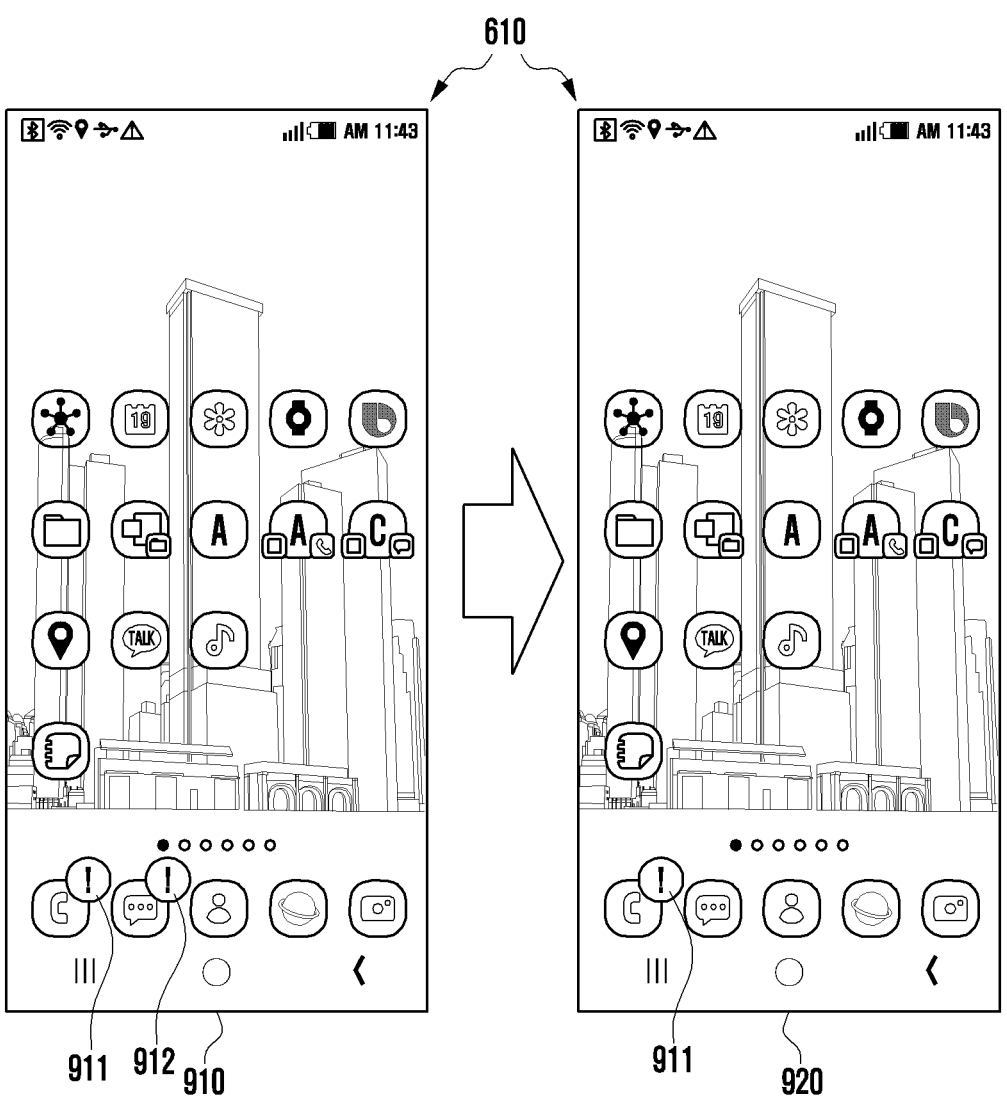
FIG. 9 is a diagram showing an icon indicating that a backup function is being performed in relation to a specific app according to an embodiment of the disclosure.

FIG. 9 is a diagram showing an icon indicating that a backup function is being executed in relation to a specific app according to an embodiment of the disclosure.

Referring to FIG. 9, a first electronic device 610 in FIG. 9 may be at least partially similar to the electronic device 101 in FIG. 1 and the first electronic device 101 in FIG. 3 or may further include other embodiments of the electronic device 101. For example, the first electronic device 610 may include a new electronic device in an initialized state (e.g., an electronic device that obtains backup data based on the execution of a backup function).

Referring to FIG. 9, the first electronic device 610 may display a first home screen 910 on a display (e.g., the display 460 in FIG. 4) in the state in which the initial setup function has been completed. The first electronic device 610 may remain in the state of executing the backup function in the background. For example, if backup data is not received according to the execution of the backup function, the first electronic device 610 may display notification icons 911 and 912 on the icons of corresponding applications. For example, if backup data related to contact information and call history of a contact-related application is not obtained, the first electronic device 610 may display an icon 911 indicating that the backup function has not been completed. As another example, if the backup function is completed in relation to the application (e.g., a message application) on which the notification icon 912 is being displayed, the first electronic device 610 may remove the notification icon 912 from the home screen.

If reception of backup data is not completed, then the first electronic device 610 executing the backup function may display a first home screen 910 including the notification icons 911 and 912 on the corresponding apps. If the backup function is completed, the first electronic device 610 may display a second home screen 920 in which the notification icon 912 was deleted from the first home screen 910.

A method of operating a first electronic device 101 according to an embodiment of the disclosure may include executing an initial setup function 411 for initial setup of the first electronic device 101, recognizing a second electronic device that is operatively connected in response to the execution of the initial setup function 411, requesting first data from the recognized second electronic device, obtaining the first data produced by the second electronic device from the second electronic device, in response to completion of the initial setup function 411, displaying a first home screen implemented based on the obtained first data on a display 460 and requesting second data corresponding to an application stored in the second electronic device from the second electronic device, obtaining the second data from the second electronic device, and displaying a second home screen implemented based on the obtained second data on the display 460.

According to an embodiment, the first data may include, as home screen-related information 412 for implementing a home screen, at least one piece of information related to the layout of the home screen, information related to wallpaper, information related to a lock screen, information related to an application to be installed, information related to an icon of an application to be installed, and/or list information.

The method according to an embodiment may further include displaying the first home screen implemented based on the initial setup function on the display 460 in response to the execution of the initial setup function, executing a backup function in response to completion of the initial setup function, and switching the first home screen being displayed on the display 460 to the second home screen implemented based on the backup function in response to the execution of the backup function.

The method according to an embodiment may further include executing the initial setup function 411 in response to a situation in which the first electronic device 101 is booted.

According to an embodiment, the initial setup function may be executed based on a first application (e.g., setup wizard-related application) related to initial setup of the first electronic device 101, and the backup function may be executed based on a second application (e.g., smart switch-related application) related to acquisition of the second data corresponding to backup data, and the first application and the second application are stored in the memory 130.

According to an embodiment, the first home screen may include a first icon corresponding to an application that has not yet been completely installed in the first electronic device 101 and a second icon corresponding to an application that has been completely installed in the first electronic device 101, and the first icon may be displayed as a dummy icon.

According to an embodiment, the first home screen may include a widget area for displaying widget content. The method according to an embodiment may further include displaying the widget area, if an application corresponding to the widget content is not installed, so as to be visually distinguished from the remaining areas of the first home screen.

The method according to an embodiment may further include identifying installation of an application corresponding to the widget content in response to the execution of the backup function, and displaying the widget content, based on the widget area, in response to completion of installation of the application corresponding to the widget content.

The method according to an embodiment may further include identifying the priority corresponding to at least one application included in the first screen in response to the execution of the backup function, installing the at least one application, based on the identified priority, and switching a first icon corresponding to the at least one application to a second icon in response to completion of installation of the at least one application.

The method according to an embodiment may further include displaying a notification message indicating that the application corresponding to the first icon is executing the backup function in response to a user input to the first icon.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. It is intended that features described with respect to separate embodiments, or features recited in separate claims, may be combined unless such a combination is explicitly specified as being excluded or such features are incompatible. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A first electronic device comprising:
a display;
a communication circuit;
a processor operatively connected to the display and the communication circuit; and
memory configured to store instructions,
wherein the instructions, when executed by the processor, cause the first electronic device to:
execute an initial setup function for initial setup of the first electronic device,
recognize a second electronic device that is operatively connected to the first electronic device through the communication circuit in response to execution of the initial setup function,
request first data related to a home screen of the second electronic device from the recognized second electronic device, wherein the first data includes at least a minimum information needed to implement the home screen,
obtain the first data from the second electronic device,
display a first home screen generated based on the obtained first data on the display,
in response to the displaying of the first home screen, complete the initial setup function,
request second data corresponding to an application included in the first home screen from the second electronic device, the second data including backup application data corresponding to the application,
obtain the second data from the second electronic device, and
display a second home screen generated based on the obtained second data including the backup application data on the display.

2. The first electronic device of claim 1, wherein the first data comprises, as home screen-related information for implementing a home screen, at least one piece of information related to a layout of the home screen, information related to wallpaper, information related to a lock screen, information related to an application to be installed, information related to an icon of an application to be installed, and/or list information.

3. The first electronic device of claim 1, wherein the instructions, when executed by the processor, cause the first electronic device to:
display the first home screen implemented based on the initial setup function on the display in response to the execution of the initial setup function;
execute a backup function in response to completion of the initial setup function; and
switch the first home screen being displayed on the display to the second home screen implemented based on the backup function in response to the execution of the backup function, wherein the backup function is executed based on a second application related to acquisition of the second data corresponding to backup data, and wherein the second application is stored in the memory.

4. The first electronic device of claim 3, wherein the first home screen comprises a widget area for displaying widget content, and wherein the instructions, when executed by the processor, cause the first electronic device to, when an application corresponding to the widget content of the recognized second electronic device is not installed on the first electronic device, display the widget area of the first electronic device so as to be visually distinguished from remaining areas of the first home screen.

5. The first electronic device of claim 4, wherein the instructions, when executed by the processor, cause the first electronic device to:

identify installation of an application corresponding to the widget content in response to the execution of the backup function, and display the widget content, based on the widget area, in response to completion of installation of the application corresponding to the widget content.

6. The first electronic device of claim 3, wherein the instructions, when executed by the processor, cause the first electronic device to:

identify a priority corresponding to at least one application included in the first home screen in response to the execution of the backup function;

install the at least one application, based on the identified priority; and switch a first icon corresponding to the at least one application to a second icon in response to completion of installation of the at least one application.

7. The first electronic device of claim 6, wherein the instructions, when executed by the processor, cause the first electronic device to display a notification message indicating that the application corresponding to the first icon is executing the backup function in response to a user input to the first icon.

8. The first electronic device of claim 1, wherein the instructions, when executed by the processor, cause the first electronic device to:

execute the initial setup function in response to a situation in which the first electronic device is booted, and wherein the initial setup function is executed based on a first application related to initial setup of the first electronic device, wherein the first application is stored in the memory.

9. The first electronic device of claim 1, wherein the first home screen comprises a first icon corresponding to an application that has not yet been completely installed in the first electronic device and a second icon corresponding to an application that has been completely installed in the first electronic device, and wherein the first icon is displayed as a dummy icon.

10. A method of operating a first electronic device, the method comprising:

executing an initial setup function for initial setup of the first electronic device;

recognizing a second electronic device that is operatively connected to the first electronic device in response to execution of the initial setup function;

requesting first data related to a home screen of the second electronic device from the recognized second electronic device, wherein the first data includes at least a minimum information needed to implement the home screen;

obtaining the first data from the second electronic device;

displaying a first home screen generated based on the obtained first data on a display, in response to the displaying of the first home screen, completing the initial setup function, requesting second data corresponding to an application included in the first home screen from the second electronic device;

obtaining the second data from the second electronic device, the second data including backup application data corresponding to the application; and displaying a second home screen generated based on the obtained second data including the backup application data on the display.

11. The method of claim 10, wherein the first data comprises, as home screen-related information for implementing a home screen, at least one piece of information related to a layout of the home screen, information related to wallpaper, information related to a lock screen, information related to an application to be installed, information related to an icon of an application to be installed, and/or list information.

12. The method of claim 10, further comprising:

displaying the first home screen implemented based on the initial setup function on the display in response to the execution of the initial setup function;

executing a backup function in response to completion of the initial setup function; and switching the first home screen being displayed on the display to the second home screen implemented based on the backup function in response to the execution of the backup function, wherein the backup function is executed based on a second application related to acquisition of the second data corresponding to backup data, and wherein the second application is stored in a memory of the first electronic device.

13. The method of claim 12, wherein the first home screen comprises a widget area for displaying widget content, and wherein the method further comprises, when an application corresponding to the widget content of the recognized second electronic device is not installed on the first electronic device, displaying the widget area of the first electronic device so as to be visually distinguished from remaining areas of the first home screen.

14. The method of claim 13, further comprising:

identifying installation of an application corresponding to the widget content in response to the execution of the backup function; and displaying the widget content, based on the widget area, in response to completion of installation of the application corresponding to the widget content.

15. The method of claim 12, further comprising:

identifying a priority corresponding to at least one application included in the first home screen in response to the execution of the backup function;

installing the at least one application, based on the identified priority; and switching a first icon corresponding to the at least one application to a second icon in response to completion of installation of the at least one application.

16. The method of claim 15, further comprising:

displaying a notification message indicating that the application corresponding to the first icon is executing the backup function in response to a user input to the first icon.

17. The method of claim 10, further comprising:

executing the initial setup function in response to a situation in which the first electronic device is booted, and wherein the initial setup function is executed based on a first application related to initial setup of the first electronic device, wherein the first application is stored in a memory of the first electronic device.

18. The method of claim 10, wherein the first home screen comprises a first icon corresponding to an application that has not yet been completely installed in the first electronic device and a second icon corresponding to an application that has been completely installed in the first electronic device, and wherein the first icon is displayed as a dummy icon.

19. One or more non-transitory computer-readable storage media storing one or more programs including instructions that, when executed by one or more processors of a device, cause the device to perform operations, the operations comprising:

executing an initial setup function for initial setup of a first electronic device;

recognizing a second electronic device that is operatively connected to the first electronic device in response to the execution of the initial setup function;

requesting first data related to a home screen of the second electronic device from the recognized second electronic device, wherein the first data includes at least a minimum information needed to implement the home screen;

obtaining the first data from the second electronic device;

displaying a first home screen generated based on the obtained first data on a display, in response to the displaying of the first home screen, complete the initial setup function, requesting second data corresponding to an application included in the first home screen from the second electronic device, the second data including backup application data corresponding to the application;

obtaining the second data from the second electronic device; and displaying a second home screen generated based on the obtained second data including the backup application data on the display.

20. The one or more non-transitory computer-readable storage media of claim 19, the operations further comprising:

executing a backup function in response to completion of the initial setup function, and wherein the initial setup function is executed based on a first application related to initial setup of the first electronic device, wherein the backup function is executed based on a second application related to acquisition of the second data corresponding to backup data, wherein the first application is a setup wizard related application, and wherein the second application is a smart switch related application.

* * * * *